(12) United States Patent
Ishikawa et al.

(10) Patent No.: US 11,079,004 B2
(45) Date of Patent: Aug. 3, 2021

(54) DRIVE APPARATUS

(71) Applicant: NIDEC CORPORATION, Kyoto (JP)

(72) Inventors: Yuki Ishikawa, Kyoto (JP); Keigo Nakamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/902,274

(22) Filed: Jun. 16, 2020

(65) Prior Publication Data

US 2020/0408297 A1 Dec. 31, 2020

(30) Foreign Application Priority Data

Jun. 28, 2019 (JP) .............................. JP2019-122193

(51) Int. Cl.
| | |
|---|---|
| *F16H 57/03* | (2012.01) |
| *F16H 57/021* | (2012.01) |
| *F16H 57/025* | (2012.01) |
| *B60K 17/04* | (2006.01) |

(52) U.S. Cl.
CPC ............ *F16H 57/021* (2013.01); *B60K 17/04* (2013.01); *F16H 57/025* (2013.01); *F16H 57/03* (2013.01)

(58) Field of Classification Search
CPC ...... F16H 57/03; F16H 57/021; F16H 57/025; B60K 17/04
See application file for complete search history.

(56) References Cited

U.S. PATENT DOCUMENTS 10,161,498 B2   12/2018   Sasaki et al.
10,400,881 B1 *  9/2019   Ramirez Ortiz ..... B60N 2/2213

FOREIGN PATENT DOCUMENTS

| CN | 105570436 A | * | 5/2016 | ........... F16H 57/032 |
| CN | 105927712 A | * | 9/2016 | ............. F16H 57/03 |
| JP | 2010246180 A |   | 10/2010 | |
| JP | 2015194221 A |   | 11/2015 | |

* cited by examiner

*Primary Examiner* — Thomas C Diaz
(74) *Attorney, Agent, or Firm* — Hauptman Ham, LLP

(57) ABSTRACT

A drive apparatus includes a motor, a transmission system, and a housing having a motor housing accommodating the motor and a gear housing accommodating the transmission system. The transmission system includes a first gear supported by a first bearing and a second gear supported by a second bearing. The gear housing includes first and second holding portions holding the first and second bearings. Surrounding ribs project from a wall surface of the gear housing, and surround an area that encompasses the first and second bearings when viewed in an axial direction. The surrounding ribs include arc-shaped ribs along outer circumferential edges of the first and second bearings, and straight ribs connected to the arc-shaped ribs. One or more of the straight ribs are each located on a common tangent to the first bearing and the second bearing.

12 Claims, 10 Drawing Sheets

DRIVE APPARATUS

CROSS-REFERENCE TO RELATED APPLICATIONS

The present invention claims priority under 35 U.S.C. § 119 to Japanese Application No. 2019-122193 filed on Jun. 28, 2019, the entire content of which is incorporated herein by reference.

FIELD OF THE INVENTION

The present invention relates to a drive apparatus.

BACKGROUND

A drive apparatus including a motor, a speed reduction mechanism, and a differential is known. Between gears meshing with each other in such a drive apparatus, stresses act in directions away from each other. In a housing that houses the gears, reinforcing ribs are arranged around bearings that support the gears to receive stresses that act on the gears.

In such a known housing, the size of the ribs needs to be increased in accordance with stresses that act on the bearings for the gears. An accompanying demand for increased strength of the housing poses a problem of an increased size of the drive apparatus.

SUMMARY

A drive apparatus according to a preferred embodiment of the present invention includes a motor including a rotor arranged to rotate about a motor axis, a transmission system arranged to transfer power of the motor to an axle, and a housing arranged to house the motor and the transmission system. The housing includes a tubular motor housing arranged to extend from a first axial side to a second axial side along the motor axis; and a gear housing arranged on the second axial side of the motor housing, and joined to the motor housing. The transmission system includes a gear system including a combination of a first gear supported by a first bearing and a second gear supported by a second bearing. The gear housing includes a first holding portion arranged to hold the first bearing, and a second holding portion arranged to hold the second bearing; and surrounding ribs arranged to project to the second axial side from a wall surface of the gear housing, and surround an area that encompasses the first bearing and the second bearing when viewed in an axial direction. The surrounding ribs include a plurality of arc-shaped ribs including an arc-shaped rib arranged to extend along an outer circumferential edge of the first bearing, and an arc-shaped rib arranged to extend along an outer circumferential edge of the second bearing; and a plurality of straight ribs connected to the plurality of arc-shaped ribs. One or more of the straight ribs are each located on a common tangent to the first bearing and the second bearing.

The above and other elements, features, steps, characteristics and advantages of the present disclosure will become more apparent from the following detailed description of the preferred embodiments with reference to the attached drawings.

DETAILED DESCRIPTION

The following description will be made with the direction of gravity being defined on the basis of positional relationships in the case where a drive apparatus 1 according to a preferred embodiment of the present invention is installed in a vehicle located on a horizontal road surface. In addition, in the accompanying drawings, an xyz coordinate system is shown appropriately as a three-dimensional orthogonal coordinate system.

In the xyz coordinate system, a z-axis direction corresponds to a vertical direction (i.e., an up-down direction), and a +z direction points upward (i.e., in a direction opposite to the direction of gravity), while a −z direction points downward (i.e., in the direction of gravity). In addition, an x-axis direction is a direction perpendicular to the z-axis direction, and corresponds to a front-rear direction of the vehicle in which the drive apparatus 1 is installed, and a +x direction points forward of the vehicle, while a −x direction points rearward of the vehicle. Note, however, that the +x direction and the −x direction may point rearward and forward, respectively, of the vehicle. A y-axis direction is a direction perpendicular to both the x-axis direction and the z-axis direction, and corresponds to a width direction (i.e., a left-right direction) of the vehicle, and a +y direction points to the left side of the vehicle, while −y direction points to the right side of the vehicle. Note that in the case where the +x direction points rearward of the vehicle, the +y direction and the −y direction may point to the right side and the left side, respectively, of the vehicle. That is, regardless of the direction of an x-axis, the +y direction points to one side in the left-right direction of the vehicle, while the −y direction points to another side in the left-right direction of the vehicle.

In the following description, unless otherwise specified, a direction (i.e., the y-axis direction) parallel to a motor axis J2 of a motor 2 will be simply referred to by the term "axial direction", "axial", or "axially", radial directions centered on the motor axis J2 will be simply referred to by the term "radial direction", "radial", or "radially", and a circumferential direction centered on the motor axis J2, i.e., a circumferential direction about the motor axis J2, will be simply referred to by the term "circumferential direction", "circumferential", or "circumferentially". Note, however, that the term "parallel" as used above includes both "parallel" and "substantially parallel".

The drive apparatus 1 according to the present preferred embodiment is installed in a vehicle having a motor as a power source, such as, for example, a hybrid electric vehicle (HEV), a plug-in hybrid vehicle (PHV), or an electric vehicle (EV), and is used as the power source thereof.

Figure 1:
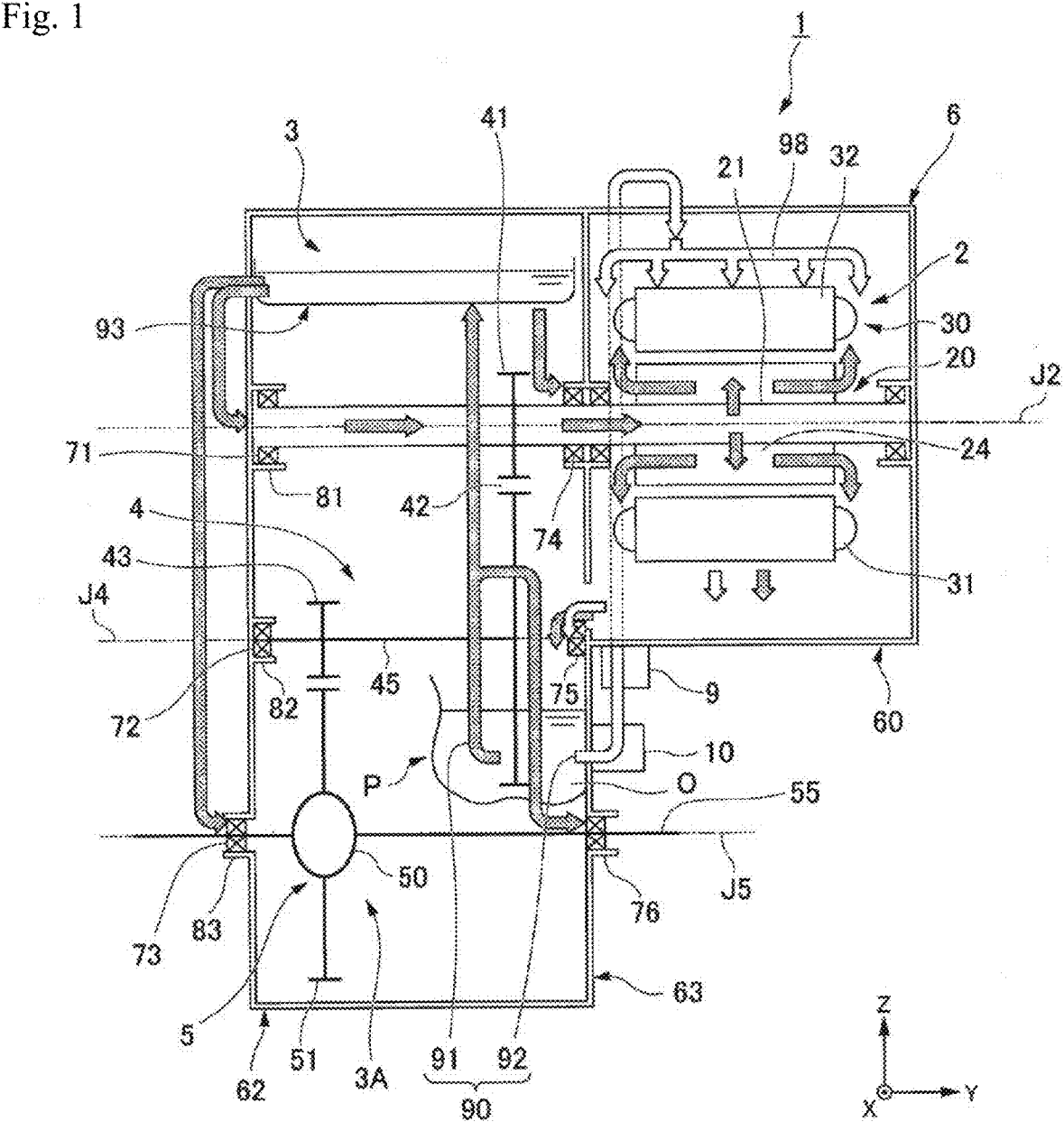
FIG. 1 is a schematic diagram of a drive apparatus according to a preferred embodiment of the present invention.
Figure 2:
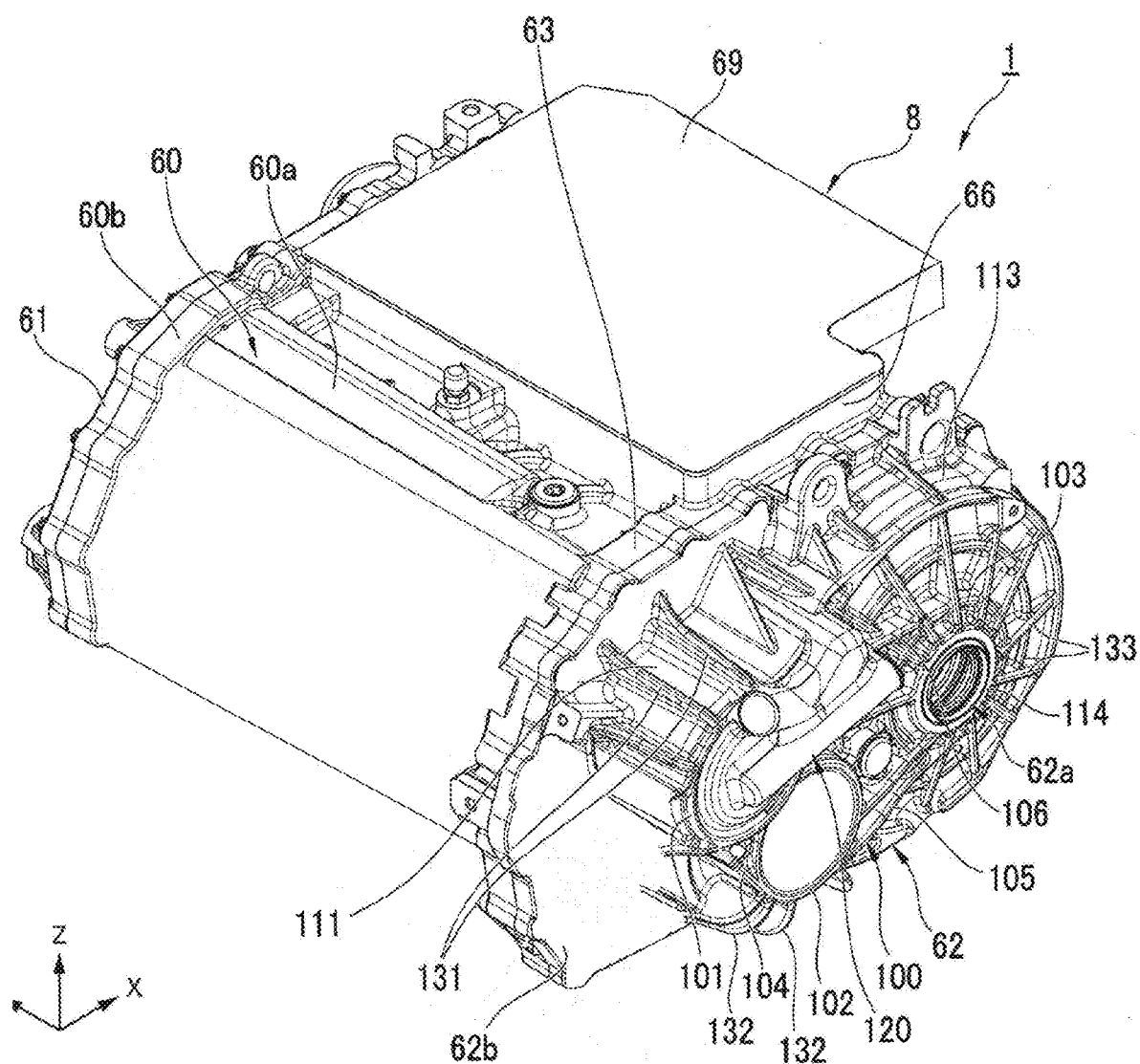
FIG. 2 is a perspective view of the drive apparatus according to a preferred embodiment of the present invention.
Figure 3:
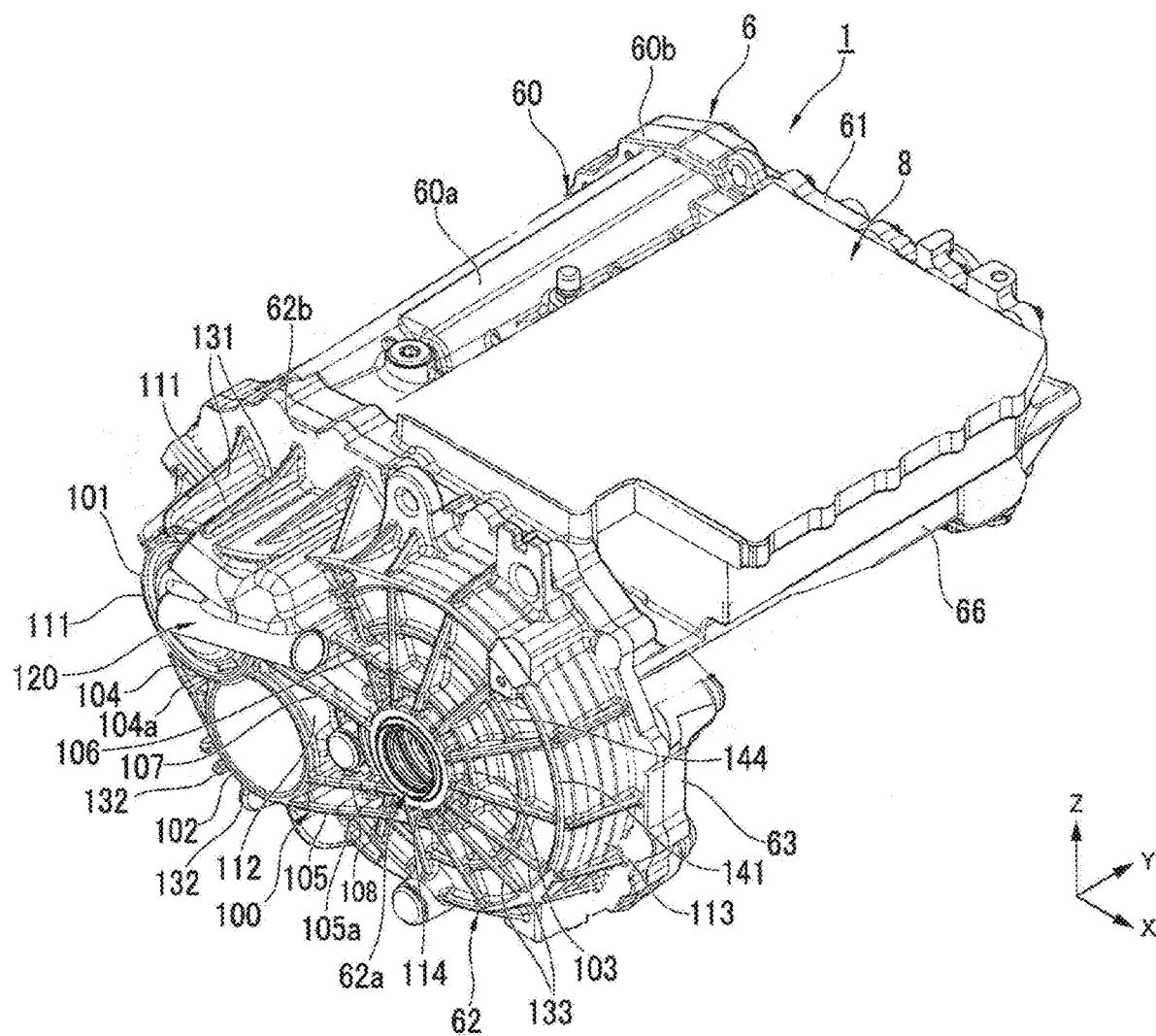
FIG. 3 is a perspective view of the drive apparatus according to a preferred embodiment of the present invention.

As illustrated in FIGS. 1, 2, and 3, the drive apparatus 1 includes the motor 2, a transmission system 3, a housing 6, an oil O housed in the housing 6, an inverter unit 8 (see FIG. 2), an oil cooler 9, and an electric oil pump 10.

The housing 6 includes a motor housing 60 arranged to house the motor 2, a joining portion 63 arranged to extend radially from an end portion of the motor housing 60 on a second axial side (i.e., a −y side), and a gear housing 62 joined to the joining portion 63 in an axial direction to house the transmission system 3 between the joining portion 63 and the gear housing 62.

The motor 2 includes a rotor 20 arranged to rotate about the motor axis J2, which extends in a horizontal direction, and a stator 30 located radially outside of the rotor 20. The motor 2 is an inner-rotor motor, in which the rotor 20 is arranged inside of the stator 30. The rotor 20 includes a shaft 21, a rotor core 24, and a rotor magnet, which is not shown.

The shaft 21 has the motor axis J2, which extends in the horizontal direction and the width direction of the vehicle, as a center thereof. The shaft 21 is a hollow shaft including a hollow portion defined therein. The shaft 21 is arranged to project into the gear housing 62 from the motor housing 60. An end portion of the shaft 21 which projects into the gear housing 62 is coupled to the transmission system 3. Specifically, the shaft 21 is coupled to an input gear (i.e., a first gear) 41.

The stator 30 is arranged to surround the rotor 20 from radially outside. The stator 30 includes a stator core 32, coils 31, and an insulator (not shown) arranged between the stator core 32 and the coils 31. The stator 30 is held by the motor housing 60. The coils 31 are connected to the inverter unit 8.

The transmission system 3 is housed in the gear housing 62. The transmission system 3 is connected to the shaft 21 on the second axial side (i.e., the −y side) along the motor axis J2. The transmission system 3 includes a reduction gear 4 and a differential 5. A torque outputted from the motor 2 is transferred to the differential 5 through the reduction gear 4.

The reduction gear 4 is connected to the shaft 21 of the motor 2. The reduction gear 4 includes the input gear 41, a counter gear (i.e., a second gear) 42, a drive gear 43, and an intermediate shaft 45. The reduction gear 4 is a speed reducer of a parallel-axis gearing type, in which center axes of gears are arranged in parallel with each other.

The input gear 41 is coupled to the shaft 21 of the motor 2. The shaft 21 is supported by a first bearing 71 and a fourth bearing 74 in the transmission system 3. That is, the input gear 41 is supported by the first bearing 71. The first bearing 71 is held by a first holding portion 81 of the gear housing 62.

The intermediate shaft 45 is arranged to extend along an intermediate axis J4 parallel to the motor axis J2. The intermediate shaft 45 is supported by a second bearing 72 and a fifth bearing 75. The counter gear 42 and the drive gear 43 are fixed to opposite ends of the intermediate shaft 45. The counter gear 42 and the drive gear 43 are connected to each other through the intermediate shaft 45. That is, the counter gear 42, which corresponds to the second gear, is supported by the second bearing 72. The second bearing 72 is held by a second holding portion 82 of the gear housing 62. The counter gear 42 is arranged to mesh with the input gear 41. The drive gear 43 is arranged to mesh with a ring gear (i.e., a third gear) 51 of the differential 5.

The differential 5 is arranged to transfer the torque outputted from the motor 2 to axles of the vehicle. The differential 5 is arranged to transfer the same torque to axles 55 of left and right wheels while absorbing a difference in speed between the left and right wheels when the vehicle is turning. The differential 5 includes the ring gear 51, which is arranged to mesh with the drive gear 43 of the reduction gear 4, and a differential case 50 fixed to the ring gear 51.

Pinion gears, a pinion shaft, side gears, etc., which are not shown, are housed in the differential case 50. The differential case 50 is supported by a third bearing 73 and a sixth bearing 76 to be rotatable about a rotation axis J5. Accordingly, the ring gear 51, which corresponds to the third gear, is supported by the third bearing 73. The third bearing 73 is held by a third holding portion 83 of the gear housing 62.

The torque outputted from the motor 2 is transferred to the ring gear 51 of the differential 5 through the shaft 21 of the motor 2, the input gear 41, the counter gear 42, the intermediate shaft 45, and the drive gear 43. That is, the transmission system 3 includes a gear system 3A including a combination of the input gear 41, which is supported by the first bearing 71, the counter gear 42 and the drive gear 43, which are supported by the second bearing 72, and the ring gear 51, which is supported by the third bearing 73. In the gear system 3A, the number of gears, the gear ratios of the gears, and so on can be modified in various manners in accordance with a desired reduction ratio.

An oil pool P, i.e., a pool of the oil O, is arranged in a lower region inside of the gear housing 62. In the present preferred embodiment, a bottom portion of the motor housing 60 is located higher than a bottom portion of the gear housing 62. This arrangement allows the oil O, having cooled the motor 2, to be easily collected into the oil pool P in the gear housing 62 from a lower region in the motor housing 60.

A portion of the gear system 3A soaks in the oil pool P. In the present preferred embodiment, a lower-side portion of the drive gear 43 soaks in the oil O. A portion of the ring gear 51 of the differential 5 may soak in the oil O. The oil O gathered in the oil pool P is scraped up by an operation of the gear system 3A. A portion of the oil O scraped up is fed to a reservoir 93. The oil O is fed from the reservoir 93 to an interior of the shaft 21 and the third bearing 73. Another portion of the oil O is spread inside of the gear housing 62, and is fed to each of the gears of the reduction gear 4 and the differential 5. Portions of the oil O which have been used to lubricate the reduction gear 4 and the differential 5 drip, and are collected into the oil pool P in the lower region in the gear housing 62.

The inverter unit 8 is arranged to control supply of an electric current to the motor 2. As illustrated in FIGS. 2 and 3, the inverter unit 8 is fixed to the housing 6. In the present preferred embodiment, the inverter unit 8 includes a box-shaped inverter housing portion 66, which defines a portion of the housing 6, an inverter body (not shown) housed in the inverter housing portion 66, and a cover portion 69 arranged to cover the inverter housing portion 66 from an upper side. A coolant pipe extending from a radiator of the vehicle is connected to the inverter unit 8. The coolant pipe is arranged to extend to the oil cooler 9 through the inverter unit 8.

The oil cooler 9 is located on a side surface of the housing 6. In the present preferred embodiment, the oil cooler 9 is located on a side surface of a lateral wall portion 60*a* of the motor housing 60. The coolant pipe extending from the inverter unit 8 and an oil pipe extending from the electric oil pump 10 are connected to the oil cooler 9.

The electric oil pump 10 is arranged to suck the oil O from the oil pool P and feed the oil O to the oil cooler 9. The electric oil pump 10 is fixed to the joining portion 63 of the housing 6. A side surface of the electric oil pump 10 and the side surface of the lateral wall portion 60*a* of the motor housing 60 may be connected to each other. A portion of the oil O which is fed from the electric oil pump 10 to pass through an interior of the oil cooler 9 is cooled through heat exchange with a coolant passing through the coolant pipe. The oil O cooled in the oil cooler 9 is fed to the motor 2.

As illustrated in FIG. 1, the oil O is arranged to circulate in an oil passage 90 arranged in the housing 6. The oil passage 90 is a channel of the oil O along which the oil O is fed from the oil pool P to the motor 2. The oil passage 90 is arranged to circulate the oil O to cool the motor 2. The oil O is used to lubricate the reduction gear 4 and the differential 5. In addition, the oil O is also used to cool the motor 2. The oil O is gathered in the oil pool P in the lower region in the gear housing 62. An oil equivalent to a lubricating oil (ATF: Automatic Transmission Fluid) for an automatic transmission having a low viscosity is preferably used as the oil O so that the oil O can perform functions of a lubricating oil and a cooling oil.

As illustrated in FIG. 1, the oil passage 90 is a channel of the oil O along which the oil O is led from the oil pool P, which lies lower than the motor 2, to the motor 2 and then back to the oil pool P, lying lower than the motor 2. The oil passage 90 includes a first oil passage 91 arranged to pass through an inside of the motor 2, and a second oil passage 92 arranged to pass through an outside of the motor 2. The oil O cools the motor 2 from the inside and the outside through the first oil passage 91 and the second oil passage 92.

The oil O is scraped up by the counter gear 42 from the oil pool P, and is led into an interior of the rotor 20 through the first oil passage 91. The oil O is injected from the rotor 20 toward the coils 31 to cool the stator 30. The oil O, having cooled the stator 30, travels to the oil pool P in the gear housing 62 through the lower region in the motor housing 60.

In the second oil passage 92, the oil O is pumped up from the oil pool P by the electric oil pump 10. The oil O is pumped up to a space above the motor 2 through the oil cooler 9, and is fed to the motor 2 from above the motor 2. The oil O, having cooled the motor 2, travels to the oil pool P in the gear housing 62 through the lower region in the motor housing 60.

As illustrated in FIGS. 2 and 3, the housing 6 includes the motor housing 60, which is tubular and is arranged to extend along the motor axis J2, a cover member 61 fastened to an end portion of the motor housing 60 on a first axial side (i.e., a +y side), the joining portion 63, which is arranged to extend radially from the end portion of the motor housing 60 on the second axial side (i.e., the −y side), and the gear housing 62, which is joined to the joining portion 63 in the axial direction.

The motor housing 60 includes the lateral wall portion 60*a*, which is tubular and is arranged to surround the motor 2 from radially outside, and a flange portion 60*b* arranged to extend radially from an end portion of the lateral wall portion 60*a* on the first axial side (i.e., the +y side). The oil cooler 9 is fastened to an outer peripheral surface of the lateral wall portion 60*a* through bolting. The inverter housing portion 66 of the inverter unit 8 is arranged to extend to a forward side (i.e., a +x side) from the lateral wall portion 60*a*. The electric oil pump 10 is attached to a bottom portion of the lateral wall portion 60*a*. In the present preferred embodiment, the motor housing 60 is a single die casting.

The stator 30 of the motor 2 is fixed to an inside of the lateral wall portion 60*a*. The flange portion 60*b* is located on side surfaces of the lateral wall portion 60*a* and the inverter housing portion 66 on the first axial side (i.e., the +y side). The cover member 61 is fastened to the flange portion 60*b* through bolting. The cover member 61 is arranged to wholly or partly cover the side surfaces of the lateral wall portion 60*a* and the inverter housing portion 66 on the first axial side.

The joining portion 63 is located on the second axial side (i.e., the −y side) of the motor 2. The joining portion 63 is arranged to greatly project to the forward side (i.e., the +x side) from an end portion of the lateral wall portion 60*a* on the second axial side. The joining portion 63 is located on side surfaces of the lateral wall portion 60*a* and the inverter housing portion 66 on the second axial side (i.e., the +y side). The gear housing 62 is fastened to the joining portion 63 through bolting from the second axial side.

The gear housing 62 has a recessed shape, opening to the first axial side (i.e., the +y side). The gear housing 62 is arranged to house the transmission system 3 therein. The gear housing 62 includes a plurality of bolt insert holes in an outer peripheral portion when viewed in the axial direction. Bolts inserted into the bolt insert holes are screwed into screw holes of the joining portion 63.

The gear housing 62 includes a through hole 62*a* arranged to pass through the gear housing 62 in the axial direction. The through hole 62*a* leads to a through hole (not shown) defined in the joining portion 63 in the axial direction. The axles 55 illustrated in FIG. 1 are passed through the through hole 62*a* of the gear housing 62 and the through hole of the joining portion 63.

Figure 5:
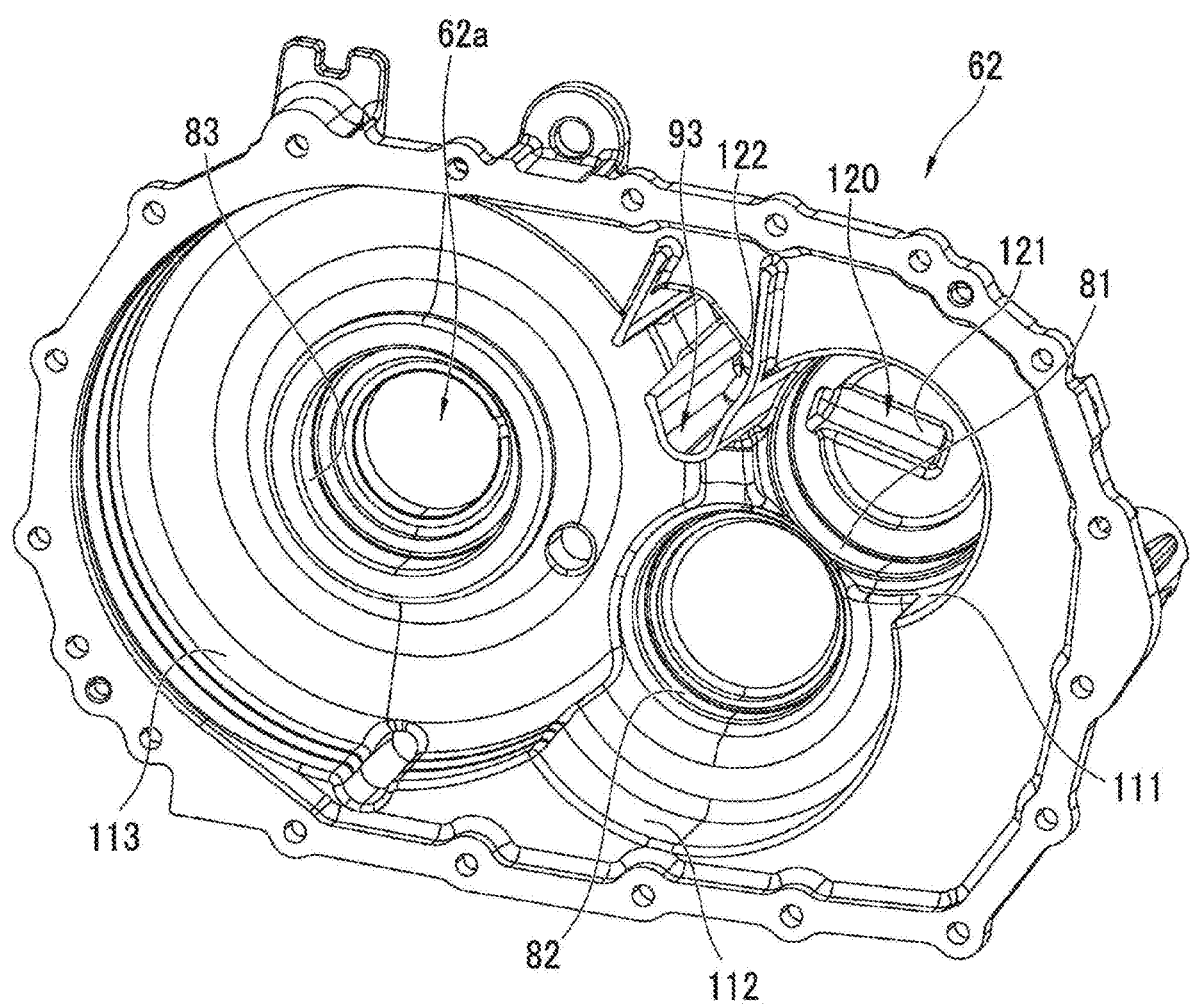
FIG. 5 is a perspective view of a gear housing according to a preferred embodiment of the present invention as viewed from a rear side.

As illustrated in FIG. 5, the gear housing 62 includes the first holding portion 81, the second holding portion 82, and the third holding portion 83 in a surface thereof which faces to the first axial side (i.e., the +y side). Each of the first holding portion 81, the second holding portion 82, and the third holding portion 83 is cylindrical, opening toward the first axial side. The first bearing 71 is held on an inner circumferential surface of the first holding portion 81. The second bearing 72 is held on an inner circumferential surface of the second holding portion 82. The third bearing 73 is held on an inner circumferential surface of the third holding portion 83.

Figure 4:
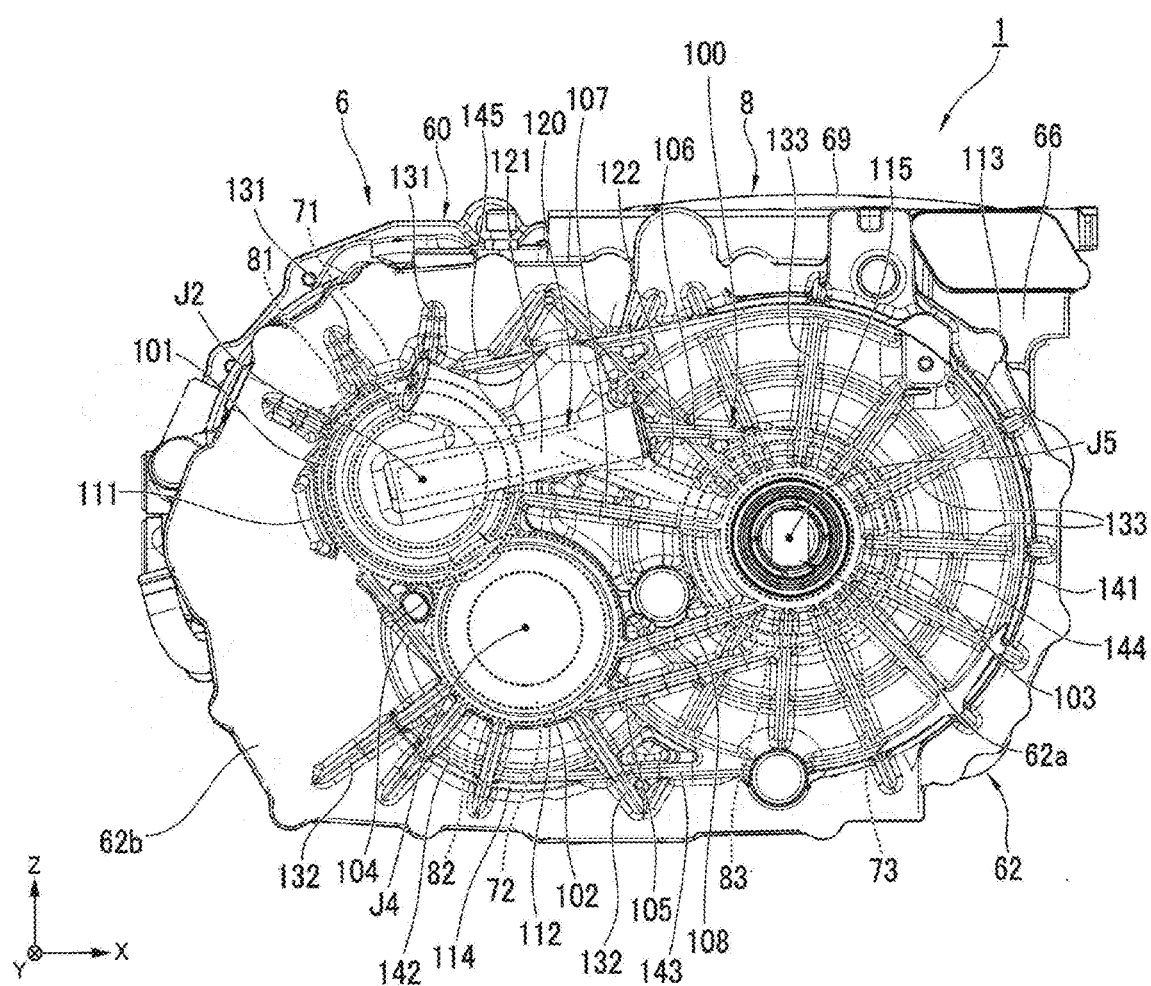
FIG. 4 is a side view of the drive apparatus according to a preferred embodiment of the present invention.

As illustrated in FIGS. 2 to 4, the gear housing 62 includes a cylindrical portion 111 coaxial with the first bearing 71, a cylindrical portion 112 and a cylindrical portion 114 each of which is coaxial with the second bearing 72, and a cylindrical portion 113 and a cylindrical portion 115 each of which is coaxial with the third bearing 73.

The shaft 21 is arranged inside of the cylindrical portion 111. The drive gear 43 is arranged inside of the cylindrical portion 112. The cylindrical portion 114 is a cylindrical portion having a diameter greater than that of the cylindrical portion 112, and is located on the first axial side (i.e., the +y side) relative to the cylindrical portion 112. The counter gear 42 is arranged inside of the cylindrical portion 114. The ring gear 51 is arranged inside of the cylindrical portion 113. The cylindrical portion 115 is a cylindrical portion having a diameter smaller than that of the cylindrical portion 113, and is arranged to project to the second axial side (i.e., the −y side) relative to the cylindrical portion 113. A circular hole surrounded by the cylindrical portion 115 corresponds to the through hole 62a through which the axle 55 is passed.

The gear housing 62 has, on a surface thereof which faces to the second axial side (i.e., the −y side), a flow passage member 120 arranged to allow a fluid to flow therein. The flow passage member 120 is arranged to overlap with the first holding portion 81 when viewed in the axial direction. The flow passage member 120 includes a flow passage pipe 121 arranged to join the reservoir 93 illustrated in FIG. 5 and an internal flow passage of the shaft 21 to each other, and a flow passage pipe 122 arranged to join the reservoir 93 and the third holding portion 83 to each other. In the present preferred embodiment, the flow passage member 120 is a portion of the gear housing 62, which is defined by a single die casting. The flow passage member 120 is connected to an end portion of the cylindrical portion 111 on the second axial side. The flow passage member 120 may alternatively be arranged at another position in the gear housing 62.

As illustrated in FIGS. 2 to 4, the gear housing 62 includes surrounding ribs 100 each of which is arranged to project to the second axial side (i.e., the −y side) from a wall surface of the gear housing 62. As illustrated in FIG. 4, the surrounding ribs 100 are arranged to surround an area that encompasses the first bearing 71, the second bearing 72, and the third bearing 73 when viewed in the axial direction.

The surrounding ribs 100 include an arc-shaped rib 101 arranged to extend along an outer circumferential edge of the first bearing 71, an arc-shaped rib 102 arranged to extend along an outer circumferential edge of the second bearing 72, an arc-shaped rib 103 arranged to extend along an outer circumferential edge of the third bearing 73, a straight rib 104 arranged to connect the arc-shaped rib 101 and the arc-shaped rib 102 to each other, a straight rib 105 arranged to connect the arc-shaped rib 102 and the arc-shaped rib 103 to each other, and a straight rib 106 arranged to extend from the arc-shaped rib 103 toward the first bearing 71.

As illustrated in FIG. 4, the arc-shaped rib 101 is arranged to overlap with the first holding portion 81 when viewed in the axial direction. The arc-shaped rib 101 does not overlap with the flow passage member 120 when viewed in the axial direction. A portion of the arc-shaped rib 101 is located on an inner side (i.e., the +x side) of the straight rib 104.

The arc-shaped rib 102 is arranged to overlap with the second holding portion 82. The arc-shaped rib 102 does not overlap with the first holding portion 81 when viewed in the axial direction. The arc-shaped rib 102 is substantially in an annular shape when viewed in the axial direction. A portion of the arc-shaped rib 102 is located on the inner side (i.e., the +x side) of the straight rib 104, while another portion of the arc-shaped rib 102 is located on an inner side (i.e., a +z side) of the straight rib 105.

The arc-shaped rib 103 is arranged to overlap with the third holding portion 83. The arc-shaped rib 103 is substantially in an annular shape, surrounding the through hole 62a, through which the axle 55 is inserted. A portion of the arc-shaped rib 103 is located between the straight rib 105 and the straight rib 106.

With the above-described configuration, the arc-shaped ribs 101 to 103 contribute to effectively preventing deformations of the first holding portion 81, the second holding portion 82, and the third holding portion 83.

As illustrated in FIG. 4, the straight rib 104 is located on a common tangent to the first bearing 71 and the second bearing 72. As illustrated in FIG. 3, the arc-shaped rib 101 and the arc-shaped rib 102 are arranged at different axial positions, and the arc-shaped rib 101 is located on the second axial side (i.e., the −y side) relative to the arc-shaped rib 102. The straight rib 104, which connects the arc-shaped rib 101 and the arc-shaped rib 102 to each other, includes, in a middle portion thereof in a longitudinal direction of the straight rib 104, a slanting portion 104a arranged to become lower toward the arc-shaped rib 102.

The straight rib 105 is located on a common tangent to the second bearing 72 and the third bearing 73. As illustrated in FIG. 3, the arc-shaped rib 102 and the arc-shaped rib 103 are arranged at different axial positions. The arc-shaped rib 102 is located on the second axial side relative to the arc-shaped rib 103. The straight rib 105, which connects the arc-shaped rib 102 and the arc-shaped rib 103 to each other, includes, in a middle portion thereof in a longitudinal direction of the straight rib 105, a slanting portion 105a arranged to become lower toward the arc-shaped rib 103.

The straight rib 106 is located on a tangent to the third bearing 73, and is arranged to extend toward the first bearing 71 to be connected to the flow passage member 120. The axial position of an end surface of the straight rib 106 which faces to the second axial side is substantially constant throughout the length of the straight rib 106.

During operation of the gear system 3A, stresses act between the input gear 41 and the counter gear 42 meshing with each other, and between the drive gear 43 and the ring gear 51 meshing with each other, in such a direction as to move the gears away from each other. Accordingly, a stress also acts between the first bearing 71, which supports the input gear 41, and the second bearing 72, which supports the counter gear 42 and the drive gear 43, in such a direction as to move the bearings away from each other. Moreover, a stress also acts between the second bearing 72 and the third bearing 73 in such a direction as to move the bearings away from each other.

If the gear housing 62 is deformed by the aforementioned stress, the input gear 41 and the counter gear 42, for example, which mesh with each other, are moved in directions away from each other, resulting in a displacement. A displacement of any gear might increase vibration and noise of the drive apparatus 1. However, since the surrounding ribs 100 according to the present preferred embodiment include the straight ribs 104 to 106, which extend along directions in which the first bearing 71, the second bearing 72, and the third bearing 73 may be moved away from one another, movement of the first bearing 71, the second bearing 72, and the third bearing 73 in directions away from one another can be prevented or minimized. This contributes to preventing a displacement of any gear.

In addition, the straight ribs 104 to 106 of the surrounding ribs 100 are located on the tangents to the first bearing 71, the second bearing 72, and the third bearing 73. With this configuration, the arc-shaped ribs 101 to 103 and the straight ribs 104 to 106 surround the first bearing 71, the second bearing 72, and the third bearing 73 entirely from outside, and fix the first, second, and third bearings 71, 72, and 73. Thus, expanding movement of the first bearing 71, the second bearing 72, and the third bearing 73 can be effectively prevented or minimized with minimum lengths of the ribs.

In the present preferred embodiment, the surrounding ribs 100 include the arc-shaped rib 101 and the straight rib 106, each of which is connected to the flow passage member 120. That is, in the case where the gear housing 62 includes a constituent part between any pair of the first bearing 71, the second bearing 72, and the third bearing 73, one or more of the arc-shaped ribs 101 to 103 and the straight ribs 104 to 106 of the surrounding ribs 100 may be connected to the constituent part, e.g., the flow passage member 120. With this configuration, the arc-shaped rib 101 and the straight rib 106 are indirectly connected to each other through the flow passage member 120, and this contributes to preventing the gear housing 62 from being deformed to move the first bearing 71 and the third bearing 73 in the directions away from each other.

Figure 6:
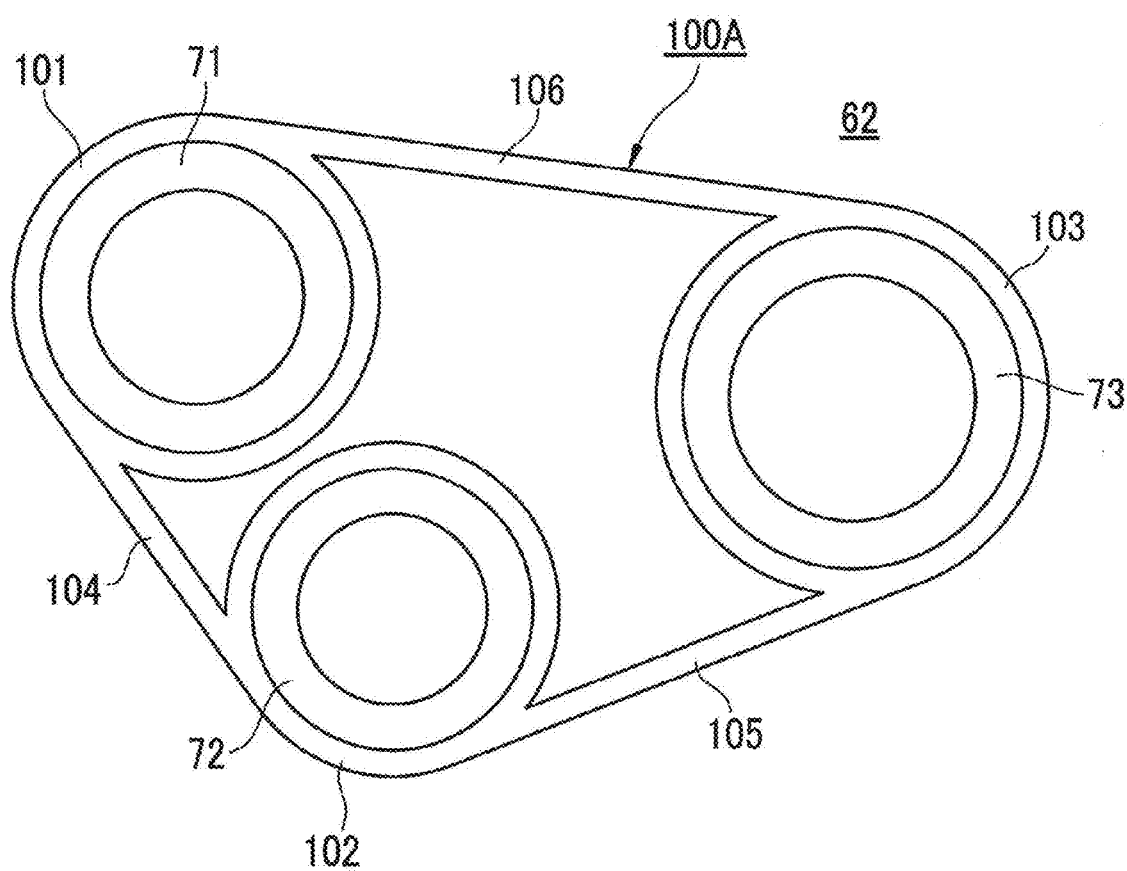
FIG. 6 is an explanatory diagram illustrating surrounding ribs according to another preferred embodiment of the present invention.

In the present preferred embodiment, the straight rib 106, which is connected to the flow passage member 120, is slightly displaced from a common tangent to the first bearing 71 and the third bearing 73. In the case of a configuration in which the straight rib 106 is connected to the arc-shaped rib 101 without the flow passage member 120 being included in the gear housing 62, it is preferable that the straight rib 106 is located on the common tangent to the first bearing 71 and the third bearing 73. Specifically, the gear housing 62 may alternatively include surrounding ribs 100A as illustrated in FIG. 6. The surrounding ribs 100A include arc-shaped ribs 101, 102, and 103 each of which is in an annular shape. That is, each of the arc-shaped ribs 101 to 103 according to a preferred embodiment of the present invention may be either in the shape of an arc joining two points on a circle or in the shape of a closed circular ring. The straight rib 104 is located on a common tangent to the arc-shaped ribs 101 and 102. The straight rib 105 is located on a common tangent to the arc-shaped ribs 102 and 103. The straight rib 106 is located on a common tangent to the arc-shaped ribs 103 and 101. An external edge of the surrounding ribs 100A is in the shape of a closed loop, surrounding the first bearing 71, the second bearing 72, and the third bearing 73 entirely from outside. With this configuration, a displacement of any gear can be effectively prevented or minimized through the surrounding ribs 100A including the straight ribs 104 to 106 having minimum lengths.

As illustrated in FIGS. 2 to 4, the gear housing 62 includes a reinforcing rib 108 arranged to connect the arc-shaped rib 102 and the arc-shaped rib 103 to each other, and a reinforcing rib 107 arranged to connect the arc-shaped rib 101 and the arc-shaped rib 103 to each other inside of an external edge of the surrounding ribs 100. With this configuration, the reinforcing rib 107 contributes to preventing the gear housing 62 from being deformed to move the first bearing 71 and the third bearing 73 in the directions away from each other. In addition, the reinforcing rib 108 contributes to preventing the gear housing 62 from being deformed to move the second bearing 72 and the third bearing 73 in the directions away from each other. Thus, a displacement of any gear can be more effectively prevented or minimized.

In the present preferred embodiment, the reinforcing rib 107 is located on a straight line joining centers of the arc-shaped ribs 101 and 103 to each other, and is arranged to connect the arc-shaped rib 101 and the arc-shaped rib 103 to each other inside of the external edge of the surrounding ribs 100. With this configuration, the reinforcing rib 107 is arranged at a position where the reinforcing rib 107 can exhibit the greatest strength against a deformation that would cause the first bearing 71 and the third bearing 73 to move in the directions away from each other. Moreover, the length of the reinforcing rib 107 is minimized. Accordingly, a displacement of any gear can be effectively prevented or minimized with use of short ribs.

As illustrated in FIG. 4, the gear housing 62 includes radial ribs 131 arranged to extend in a radial manner with the first bearing 71 in a center, radial ribs 132 arranged to extend in a radial manner with the second bearing 72 in a center, and radial ribs 133 arranged to extend in a radial manner with the third bearing 73 in a center when viewed in the axial direction. The gear housing 62 includes an arc-shaped rib 141 arranged to extend along an end surface, on the second axial side, of the cylindrical portion 113 coaxial with the third bearing 73, and an arc-shaped rib 142 arranged to extend along an end surface, on the second axial side, of the cylindrical portion 114 coaxial with the second bearing 72.

The radial ribs 131 are made up of three plate-shaped ribs. As illustrated in FIGS. 3 and 4, each radial rib 131 is arranged to extend from a side surface of the cylindrical portion 111 coaxial with the first bearing 71 radially outward with respect to the cylindrical portion 111. In the present preferred embodiment, each radial rib 131 is arranged to extend to the upper side of the cylindrical portion 111. With this configuration, the radial ribs 131 contribute to preventing a deformation of the cylindrical portion 111. This contributes to more effectively preventing a movement of the first bearing 71, and preventing a displacement of any gear.

The radial ribs 132 are made up of four plate-shaped ribs. As illustrated in FIG. 4, each radial rib 132 is arranged to extend from a side surface of the cylindrical portion 112 coaxial with the second bearing 72 radially outward with respect to the cylindrical portion 112. Each radial rib 132 is arranged to extend radially outward beyond the cylindrical portion 114. In the present preferred embodiment, each radial rib 132 is arranged to extend to the lower side of the cylindrical portions 112 and 114. With this configuration, the radial ribs 132 contribute to preventing deformations of the cylindrical portion 112 and the cylindrical portion 114. This contributes to more effectively preventing a movement of the second bearing 72, and preventing a displacement of any gear.

The radial ribs 133 are made up of eleven plate-shaped ribs. As illustrated in FIGS. 3 and 4, the radial ribs 133 are arranged to extend in a radial manner from a side surface of the cylindrical portion 115 coaxial with the third bearing 73 radially outward with respect to the cylindrical portion 115. A radially outer end portion of each radial rib 133 is connected to the arc-shaped rib 141 extending along the end surface of the cylindrical portion 113 on the second axial side. With this configuration, the radial ribs 133 contribute to preventing a deformation of the cylindrical portion 115. This contributes to increasing strength of a portion that holds the axle 55 in the drive apparatus 1, and reducing an unwanted movement of the axle 55 caused by vibration.

The gear housing 62 includes an arc-shaped rib 144 located between the arc-shaped rib 103 and the arc-shaped rib 141. The arc-shaped rib 144 is in the shape of an arc, and is coaxial with the third bearing 73. Each radial rib 133 is arranged to cross each of the arc-shaped rib 103 and the arc-shaped rib 144. With this configuration, an unwanted movement of the axle 55 can be more effectively prevented or minimized. In addition, the arc-shaped rib 103 is thus reinforced to more effectively prevent or minimize a displacement of any gear.

As illustrated in FIG. 3, each radial rib 133 lies farthest to the second axial side (i.e., the −y side) at a radially inner end connected to the side surface of the cylindrical portion 115, and lies farthest to the first axial side (i.e., the +y side) at a radially outer end connected to the arc-shaped rib 141. That is, an end surface of the radial rib 133 which faces to the second axial side is a slanting surface arranged to become lower from the radially inner end toward the radially outer end.

As illustrated in FIG. 4, the gear housing 62 includes a cylindrical portion reinforcing rib 143 located on a common tangent to the cylindrical portion 114 coaxial with the second bearing 72 and the cylindrical portion 113 coaxial with the third bearing 73, and connected to side surfaces of the two cylindrical portions 114 and 113. Portions of both ends of the cylindrical portion reinforcing rib 143 are connected to the arc-shaped rib 141 on the cylindrical portion 113 and the arc-shaped rib 142 on the cylindrical portion 114, respectively. The above configuration contributes to preventing a deformation of each of the cylindrical portions 113 and 114, which house the corresponding gears.

The gear housing 62 includes a cylindrical portion reinforcing rib 145 located on a common tangent to the cylindrical portion 111 coaxial with the first bearing 71 and the cylindrical portion 113 coaxial with the third bearing 73, and connected to the side surfaces of the two cylindrical portions 111 and 113. An end portion of the cylindrical portion reinforcing rib 145 on the side on which the cylindrical portion 113 lies is connected to the arc-shaped rib 141 and the side surface of the cylindrical portion 113. The above configuration contributes to preventing a deformation of each of the cylindrical portions 111 and 113.

While preferred embodiments of the present invention have been described above, it will be understood that features, a combination of the features, and so on according to the preferred embodiments are only illustrative and not restrictive, and that an addition, elimination, and substitution of a feature(s), and other modifications can be made without departing from the scope and spirit of the present invention. Also note that the present invention is not limited by the preferred embodiments.

While the housing 6 includes the joining portion 63 in the above-described preferred embodiment, this is not essential to the present invention. The housing 6 may include the motor housing 60 and the gear housing 62 without including the joining portion 63. In other words, the motor housing 60 and the gear housing 62 may not be separated from each other by the joining portion.

Figure 7:
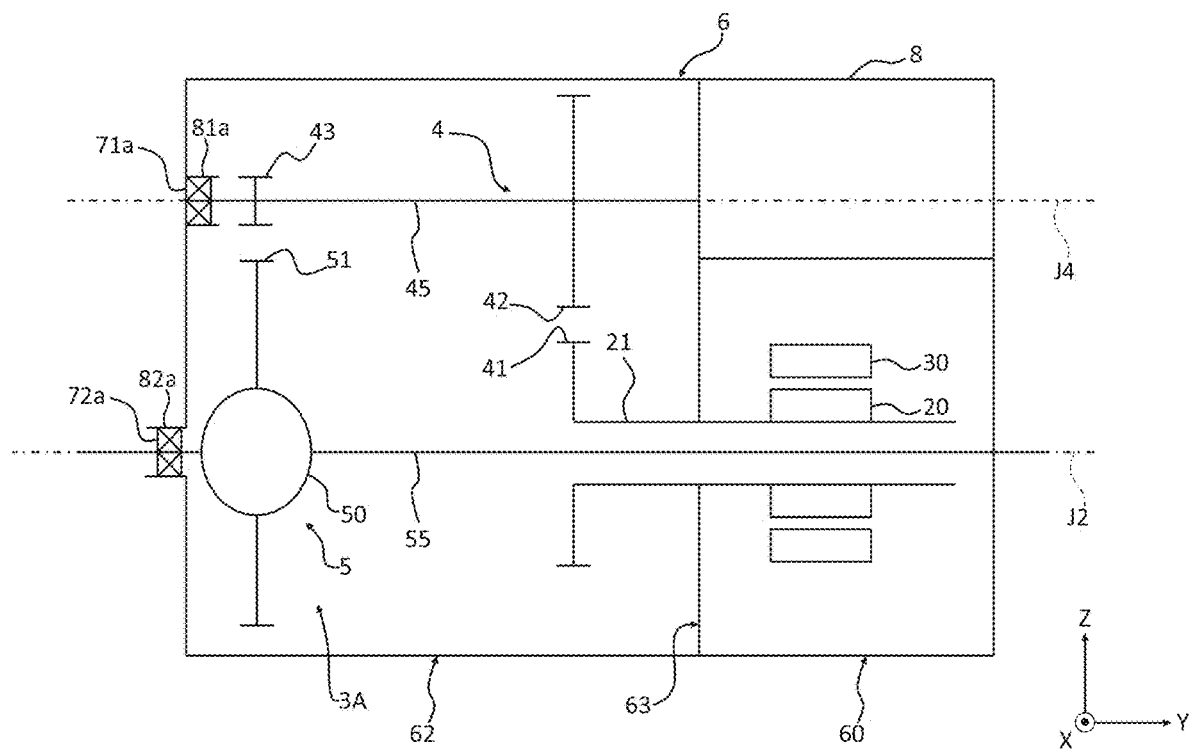
FIG. 7 is a schematic diagram of a drive apparatus according to a first modification of the above preferred embodiment.

As illustrated in FIG. 7, in a first modification of the above-described preferred embodiment, a portion of an axle 55 is arranged in an interior of a shaft 21, and is arranged to rotate about a motor axis J2. That is, the axle 55 is arranged to be coaxial with the shaft 21. The shaft 21 corresponds to a motor shaft recited in the claims. The axle 55 corresponds to an output shaft recited in the claims.

A gear system 3A according to the first modification includes a combination of an input gear 41, a counter gear 42, a drive gear 43, and a ring gear 51. The input gear 41 and the shaft 21 are supported by a bearing (not shown) inside of a gear housing 62. The counter gear 42, the drive gear 43, and an intermediate shaft 45 are supported by a first bearing 71a. The first bearing 71a is held by a first holding portion 81a of the gear housing 62. The ring gear 51 is arranged to rotate about the motor axis J2. The ring gear 51, a differential case 50, and the axle 55 are supported by a second bearing 72a. The second bearing 72a is held by a second holding portion 82a of the gear housing 62.

In the first modification, the counter gear 42 corresponds to a first gear recited in the claims. The ring gear 51 corresponds to a second gear recited in the claims. The input gear 41 corresponds to a fourth gear recited in the claims.

Figure 8:
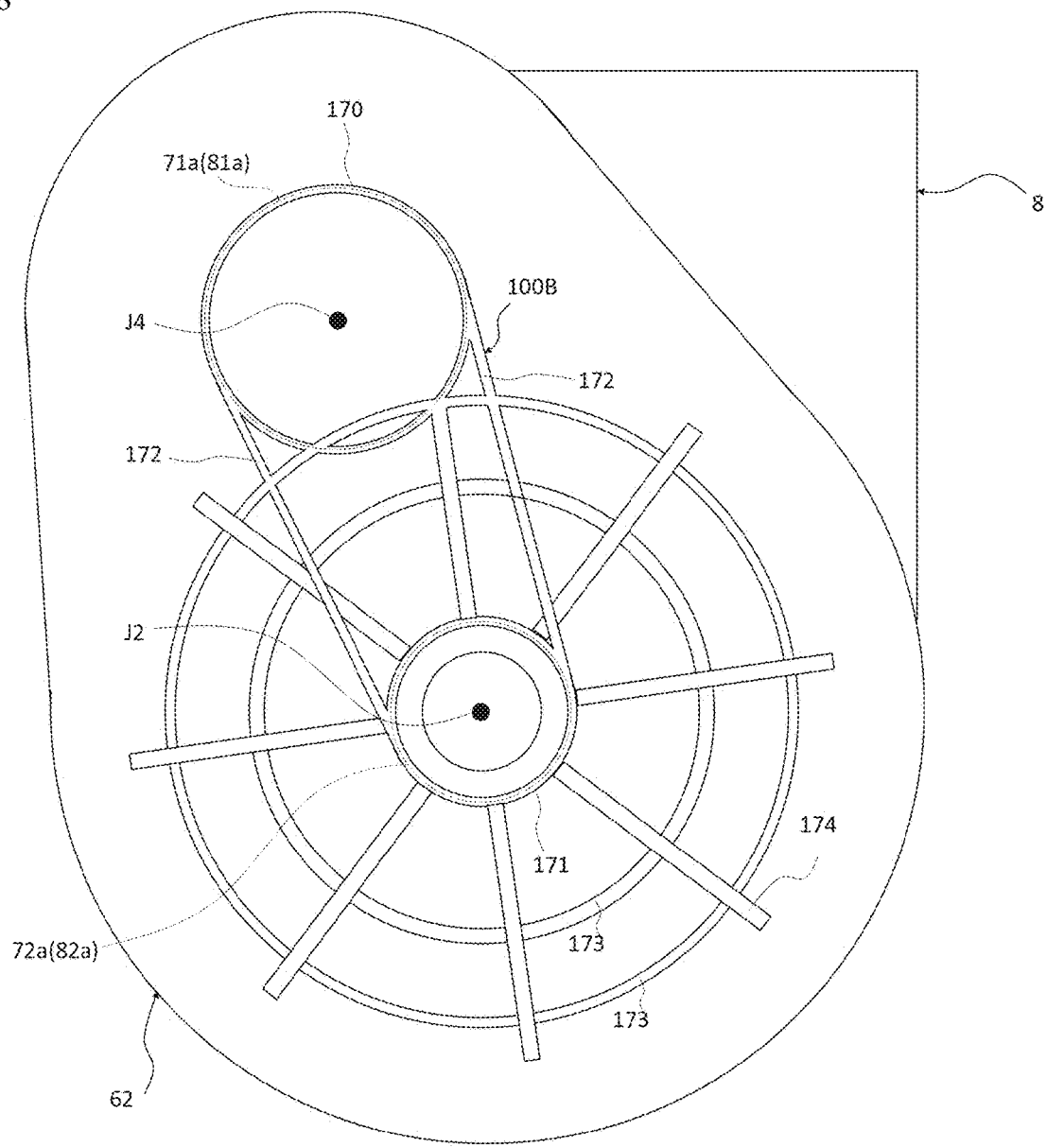
FIG. 8 is a side view of the drive apparatus according to the first modification.

As illustrated in FIG. 8, the gear housing 62 includes surrounding ribs 100B arranged to project to the second axial side (i.e., the −y side) from a wall surface of the gear housing 62. The surrounding ribs 100B are arranged to surround an area that encompasses the first bearing 71a and the second bearing 72a when viewed in the axial direction.

The surrounding ribs 100B include an arc-shaped rib 170 arranged to extend along an outer circumferential edge of the first bearing 71a, an arc-shaped rib 171 arranged to extend along an outer circumferential edge of the second bearing 72a, and straight ribs 172 each of which is arranged to connect the arc-shaped rib 170 and the arc-shaped rib 171 to each other. Each straight rib 172 is located on a common tangent to the first bearing 71a and the second bearing 72a.

The surrounding ribs 100B further include a plurality of arc-shaped ribs 173 and a plurality of radial ribs 174. Each arc-shaped rib 173 is in the shape of an arc, and is coaxial with the second bearing 72a. The radial ribs 174 are arranged to extend in a radial manner from a side surface of a cylindrical portion coaxial with the second bearing 72a radially outward with respect to the cylindrical portion. Each arc-shaped rib 173 is arranged to cross each radial rib 174.

Since the axle 55 is arranged to be coaxial with the shaft 21 in a drive apparatus 1 according to the first modification, a reduced size of the drive apparatus 1 as a whole can be easily achieved. With the configuration in which the axle 55 is arranged to be coaxial with the shaft 21, an outward movement of the second bearing 72a might easily cause a stress to act on the gear housing 62. Meanwhile, since each straight rib 172 is located on the common tangent to the first bearing 71a and the second bearing 72a in the first modification, an outward movement of the second bearing 72a could be effectively prevented or minimized with minimum lengths of the ribs.

Figure 9:
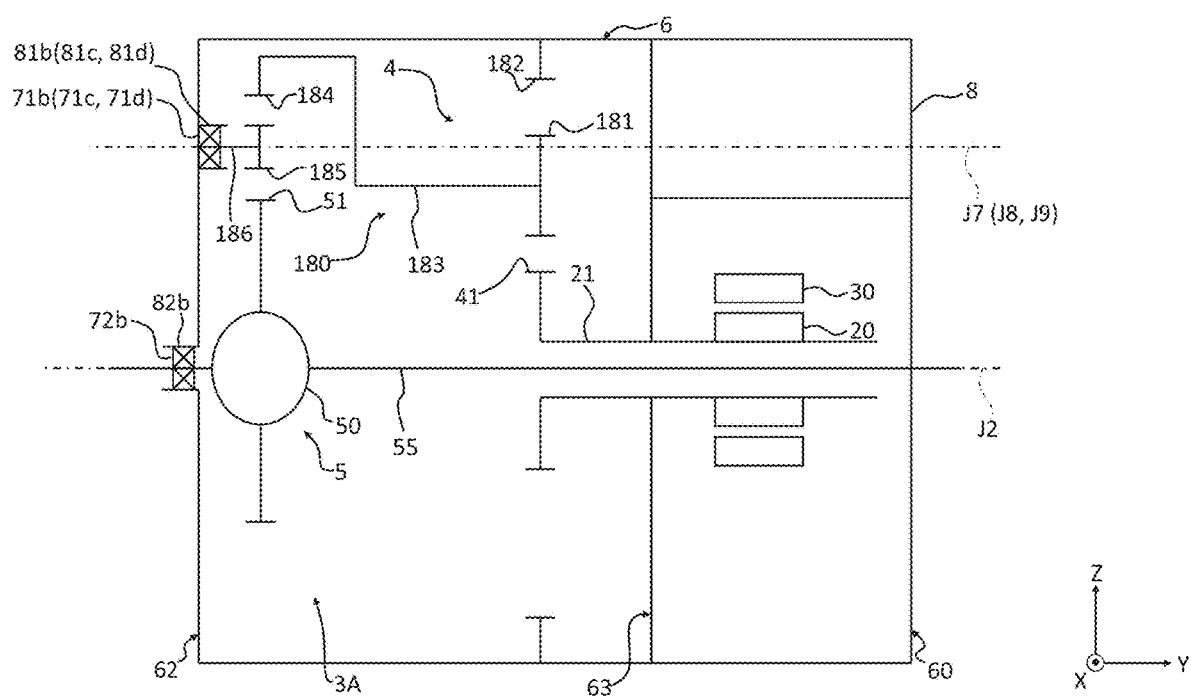
FIG. 9 is a schematic diagram of a drive apparatus according to a second modification of the above preferred embodiment.
Figure 10:
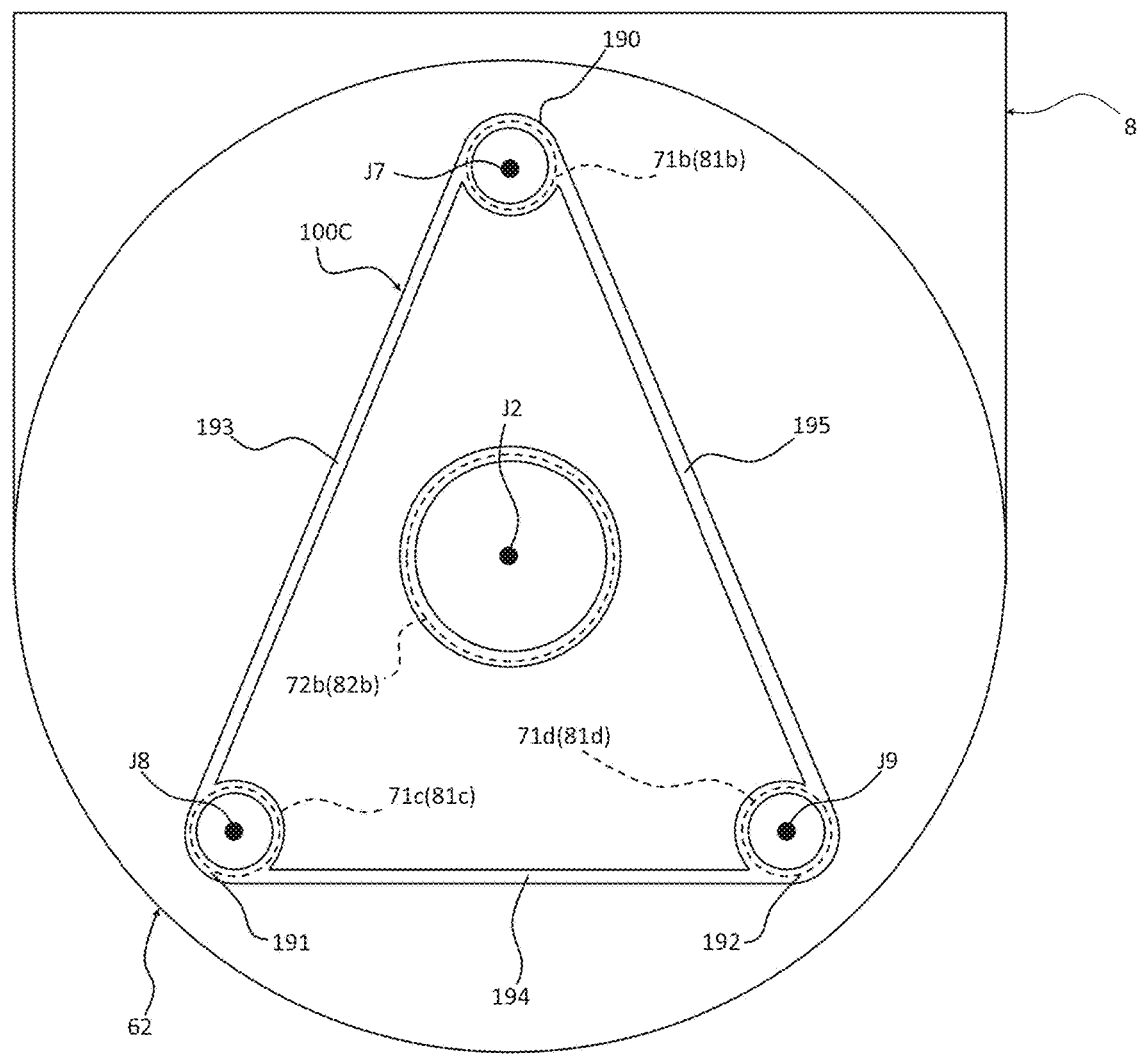
FIG. 10 is a side view of the drive apparatus according to the second modification.

In a second modification of the above-described preferred embodiment illustrated in FIGS. 9 and 10, a gear system 3A includes a planetary gear mechanism 180. As illustrated in FIG. 9, the planetary gear mechanism 180 includes an input gear 41, first planetary gears 181, a first internal gear 182, a carrier 183, a second internal gear 184, and second planetary gears 185.

The input gear 41 is arranged to rotate about a motor axis J2, and serves as a sun gear of the planetary gear mechanism 180. Each first planetary gear 181 is arranged to mesh with the input gear 41. The first planetary gears 181, the number of which is more than one, for example, are arranged at regular intervals in the circumferential direction about the motor axis J2. The first internal gear 182 is in an annular shape, and is centered on the motor axis J2. The first internal gear 182 is arranged to mesh with each first planetary gear 181. The first internal gear 182 is fixed to an inside surface of a gear housing 62. Each first planetary gear 181 is connected to the carrier 183 on the second axial side.

The carrier 183 is arranged to support the first planetary gears 181 such that each first planetary gear 181 is capable of revolving around the motor axis J2. The carrier 183 is arranged to rotate about the motor axis J2 in accordance with the revolving of the first planetary gears 181 around the motor axis J2. The carrier 183 is connected to the second internal gear 184 on the second axial side. The second internal gear 184 is in an annular shape, and is centered on the motor axis J2. The second internal gear 184 is arranged to rotate about the motor axis J2 in accordance with the rotation of the carrier 183 and the revolving of the first planetary gears 181. The internal gear 184 is arranged to mesh with each second planetary gear 185.

The second planetary gears 185, the number of which is more than one, for example, are arranged at regular intervals in the circumferential direction about the motor axis J2. In the second modification, the number of second planetary gears 185 is three. The three second planetary gears 185 are arranged to rotate about intermediate axes J7, J8, and J9, respectively. Each second planetary gear 185 is connected to a shaft 186 on the second axial side. Each shaft 186 is arranged to rotate about a corresponding one of the intermediate axes J7, J8, and J9. The second planetary gear 185 and the shaft 186 which are arranged to rotate about the intermediate axis J7 are supported by a first bearing 71b. The first bearing 71b is held by a first holding portion 81b of the gear housing 62. The second planetary gear 185 and the shaft 186 which are arranged to rotate about the intermediate axis J8 are supported by a second bearing 71c. The second bearing 71c is held by a second holding portion 81c of the gear housing 62. The second planetary gear 185 and the shaft 186 which are arranged to rotate about the intermediate axis J9 are supported by a third bearing 71d. The third bearing 71d is held by a third holding portion 81d of the gear housing 62. Each second planetary gear 185 is arranged to mesh with a ring gear 51 on a radially inner side with respect to the motor axis J2.

In the second modification, the second planetary gear 185 arranged to rotate about the intermediate axis J7 corresponds to the first gear recited in the claims. The second planetary gear 185 arranged to rotate about the intermediate axis J8 corresponds to the second gear recited in the claims. The second planetary gear 185 arranged to rotate about the intermediate axis J9 corresponds to a third gear recited in the claims.

The ring gear 51, a differential case 50, and an axle 55 are supported by a fourth bearing 72b. The fourth bearing 72b is held by a fourth holding portion 82b of the gear housing 62.

As illustrated in FIG. 10, the gear housing 62 includes surrounding ribs 100C arranged to project to the second axial side (i.e., the −y side) from a wall surface of the gear housing 62. The surrounding ribs 100C are arranged to surround an area that encompasses the first bearing 71b, the second bearing 71c, and the third bearing 71d when viewed in the axial direction.

The surrounding ribs 100C include an arc-shaped rib 190 arranged to extend along an outer circumferential edge of the first bearing 71b, an arc-shaped rib 191 arranged to extend along an outer circumferential edge of the second bearing 71c, and an arc-shaped rib 192 arranged to extend along an outer circumferential edge of the third bearing 71d. The surrounding ribs 100C further include a straight rib 193 arranged to connect the arc-shaped rib 190 and the arc-shaped rib 191 to each other, a straight rib 194 arranged to connect the arc-shaped rib 191 and the arc-shaped rib 192 to each other, and a straight rib 195 arranged to connect the arc-shaped rib 192 and the arc-shaped rib 190 to each other. In the gear housing 62, the straight rib 193 is located on a common tangent to the first bearing 71b and the second bearing 71c. The straight rib 194 is located on a common tangent to the second bearing 71c and the third bearing 71d. The straight rib 195 is located on a common tangent to the third bearing 71d and the first bearing 71b.

In a drive apparatus 1 according to the second modification, the planetary gear mechanism 180 of the gear system 3 contributes to reducing the size of the drive apparatus 1 as a whole. In the case where the first bearing 71b, the second bearing 71c, and the third bearing 71d define portions of the planetary gear mechanism 180, a stress tends to be easily applied from each of the bearings 71b, 71c, and 71d to the gear housing 62. Meanwhile, since the straight ribs 193, 194, and 195 are located on the common tangents to the bearings 71b, 71c, and 71d in the second modification, an outward movement of each of the bearings 71b, 71c, and 71d could be effectively prevented or minimized with minimum lengths of the ribs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive apparatus comprising:
   a motor including a rotor arranged to rotate about a motor axis;
   a transmission system arranged to transfer power of the motor to an axle; and
   a housing arranged to house the motor and the transmission system; wherein
   the housing includes:
      a tubular motor housing arranged to extend from a first axial side to a second axial side along the motor axis; and
      a gear housing arranged on the second axial side of the motor housing, and joined to the motor housing;
   the transmission system includes a gear system including a combination of a first gear supported by a first bearing and a second gear supported by a second bearing;
   the gear housing includes:
      a first holding portion arranged to hold the first bearing, and a second holding portion arranged to hold the second bearing; and
      surrounding ribs arranged to project to the second axial side from a wall surface of the gear housing, and surround an area that encompasses the first bearing and the second bearing when viewed in an axial direction;
   the surrounding ribs include:
      a plurality of arc-shaped ribs including an arc-shaped rib arranged to extend along an outer circumferential edge of the first bearing, and an arc-shaped rib arranged to extend along an outer circumferential edge of the second bearing; and
      a plurality of straight ribs connected to the plurality of arc-shaped ribs; and
   one or more of the straight ribs are each located on a common tangent to the first bearing and the second bearing.

2. The drive apparatus according to claim 1, wherein
   the gear housing includes a third holding portion arranged to hold a third bearing;
   the surrounding ribs are arranged to surround an area that encompasses the first bearing, the second bearing, and the third bearing;
   one of the plurality of arc-shaped ribs is arranged to extend along an outer circumferential edge of the third bearing; and
   one or more of the straight ribs are each located on a common tangent to the second bearing and the third bearing or on a common tangent to the third bearing and the first bearing.

3. The drive apparatus according to claim 1, wherein
   the rotor includes a hollow motor shaft;
   the gear system includes a combination of the first gear, the second gear, and a fourth gear arranged to rotate together with the motor shaft and coaxially with the second gear; and
   the transmission system includes:
      a differential including the second gear; and an output shaft connected to the differential to rotate in accordance with rotation of the second gear, and including a portion arranged in an interior of the motor shaft.

4. The drive apparatus according to claim 1, wherein
the gear system includes a planetary gear mechanism including a sun gear, a planetary gear arranged to mesh with the sun gear, an internal gear being in an annular shape and arranged to mesh with the planetary gear, and a carrier connected to the planetary gear; and
one of the first gear and the second gear defines a portion of the planetary gear mechanism.

5. The drive apparatus according to claim 1, wherein the arc-shaped rib arranged to extend along the outer circumferential edge of the first bearing, and the arc-shaped rib arranged to extend along the outer circumferential edge of the second bearing, are arranged to overlap with the first holding portion and the second holding portion, respectively, when viewed in the axial direction.

6. The drive apparatus according to claim 1, wherein
the arc-shaped rib arranged to extend along the outer circumferential edge of the first bearing is connected to the straight rib located on the common tangent to the first bearing and the second bearing; and
the arc-shaped rib arranged to extend along the outer circumferential edge of the second bearing is connected to the straight rib located on the common tangent to the first bearing and the second bearing.

7. The drive apparatus according to claim 1, wherein
the gear housing includes a flow passage member arranged to allow a fluid to flow therein, and arranged to overlap with the first holding portion when viewed in the axial direction;
the plurality of straight ribs include a straight rib arranged to extend toward the first bearing; and
at least one of the arc-shaped rib arranged to extend along the outer circumferential edge of the first bearing and the straight rib arranged to extend toward the first bearing is connected to the flow passage member.

8. The drive apparatus according to claim 1, wherein the gear housing includes a reinforcing rib arranged to connect two of the arc-shaped ribs to each other inside of an external edge of the surrounding ribs.

9. The drive apparatus according to claim 8, wherein the reinforcing rib is located on a straight line joining centers of the two arc-shaped ribs to each other.

10. The drive apparatus according to claim 1, wherein the gear housing includes radial ribs arranged to extend in a radial manner with the first bearing in a center when viewed in the axial direction, and/or radial ribs arranged to extend in a radial manner with the second bearing in a center when viewed in the axial direction.

11. The drive apparatus according to claim 10, wherein
the gear housing includes at least one of a cylindrical portion coaxial with the first bearing and a cylindrical portion coaxial with the second bearing; and
the radial ribs are arranged to extend from a side surface of the cylindrical portion radially outward with respect to the cylindrical portion.

12. The drive apparatus according to claim 1, wherein the gear housing includes:
two cylindrical portions coaxial with the first bearing and the second bearing, respectively; and
a cylindrical portion reinforcing rib located on a common tangent to the two cylindrical portions, and connected to side surfaces of the two cylindrical portions.

* * * * *